(12) United States Patent
Noehring et al.

(10) Patent No.: US 6,249,739 B1
(45) Date of Patent: Jun. 19, 2001

(54) OPERATING VEHICULAR PROCESSOR-BASED SYSTEMS

(75) Inventors: Lee P. Noehring, Peoria; Bruce L. Fleming, Phoenix, both of AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/387,349

(22) Filed: Aug. 31, 1999

(51) Int. Cl.$^7$ .................................................... G06F 1/30
(52) U.S. Cl. ......................................... 701/113; 701/115
(58) Field of Search ..................................... 701/113, 102, 701/101, 115, 114; 710/100, 101, 260; 713/323; 123/179.16, 179.21, 179.3

(56) References Cited

U.S. PATENT DOCUMENTS

| | | | | |
|---|---|---|---|---|
| 4,205,376 | * | 5/1980 | Yoshida | 701/1 |
| 4,733,101 | * | 3/1988 | Graham et al. | 307/10.1 |
| 4,766,580 | | 8/1988 | Go et al. | 369/21 |
| 4,979,143 | | 12/1990 | Takano et al. | 364/900 |
| 5,095,438 | | 3/1992 | Sasaki | 364/431 |
| 5,375,247 | | 12/1994 | Hueser | 395/750 |
| 5,385,126 | * | 1/1995 | Matthews | 123/179.21 |
| 5,487,002 | * | 1/1996 | Diller et al. | 701/1 |
| 5,936,316 | * | 8/1999 | Jurkiewicz et al. | 123/179.3 |
| 6,059,843 | | 5/2000 | Kirkhart | 781/213 |
| 6,065,124 | * | 5/2000 | Lee | 713/323 |

OTHER PUBLICATIONS

Patent Abstracts of Japan, vol. 1998, No. 08, Jun. 30, 1998, & JP 10 061537 A (Kansei Corp)., Mar. 3, 1998, abstract.

* cited by examiner

Primary Examiner—Andrew M. Dolinar
Assistant Examiner—Hieu T Vo
(74) Attorney, Agent, or Firm—Trop, Pruner & Hu, P.C.

(57) ABSTRACT

A processor-based system in a vehicle may be quickly suspended to a lower power consumption state after detecting a signal indicative of engine cranking. Advantageously, the system may be caused to enter the lower power consumption state prior to the time that power is reduced as a result of engine cranking. If the operating system is active when the signal is detected, a routine may be called which causes device contexts to be saved before returning the system to a reduced power consumption state. Otherwise, if the operating system is inactive, an interrupt handler may be called which immediately returns the system to a reduced power consumption state. In this way, the system may be reliably restored to a lower power consumption state before being exposed to the power reduction inherent in engine cranking.

20 Claims, 4 Drawing Sheets

OPERATING VEHICULAR PROCESSOR-BASED SYSTEMS

BACKGROUND

This invention relates generally to vehicular processor-based systems.

A number of processor-based systems may be used in vehicles such as automobiles or trucks. Conventionally, an engine controller is utilized to control the operation of the engine. A body controller may be utilized to control all other operations of the vehicle such as remote opening of doors, controlling radios and the like. In addition, vehicles may include processor-based systems for providing conventional personal computer functions. For example, in car personal computers may provide routing and mapping information as well as entertainment through a compact disc or digital video disc player. Thus, a variety of conventional computer functions including mapping functions, music, movies and game functions may be provided through the in car personal computer.

In most personal computers, it is desirable to have at least one lower power consumption state. Particularly, in battery powered systems, it is desirable to reduce power consumption during periods of inactivity. Thus, some processor-based systems used in vehicles may have lower power consumption states such as suspend-to-RAM (STR) or suspend-to-non-volatile memory (STN). The STR mode may be a reduced power consumption mode that still continues to use some power. However, the system can generally be reactivated more quickly from the suspend-to-RAM state than from the suspend-to-non-volatile memory state.

A problem arises in connection with vehicular processor-based system when the engine is cranked. Conventionally, when the engine is cranked, the available power is greatly reduced for a period of time. A processor-based system, that is not in its reduced power consumption state, may be adversely affected by the reduced power condition. Generally, if nothing else is done, the processor-based system experiencing such a reduced power condition may shut itself down and automatically reboot.

In connection with processor-based systems such as those used for in car personal computers, this rebooting sequence delays the initiation of the personal computer. It would be disconcerting to the user if every time the user turns the engine on, the in car personal computer attempts to come on, fails and then reboots. As a result of this sequence of operation, a delay period may be created before the processor-based system may be accessed.

One available solution for this problem is to provide a potential source, such as a battery, in association with the vehicular processor-based system. However, this solution tends to be unreliable. For example, providing a battery in association with the processor-based system may require replacing the battery periodically. Thus, the user is burdened with special care instructions for the in car personal computer. In addition, requiring an additional battery or other potential source raises the cost of the overall computer system.

Thus, there is a continuing need for a better way to adapt vehicular processor-based systems to the period during cranking when the available power is reduced.

SUMMARY

In accordance with one aspect, a method for operating a processor-based system in a vehicle includes detecting a signal indicative of engine cranking. The system is suspended to a lower power consumption state before a crank induced power reduction occurs.

Other aspects are set forth in the accompanying detailed description and claims.

DETAILED DESCRIPTION

Figure 1:
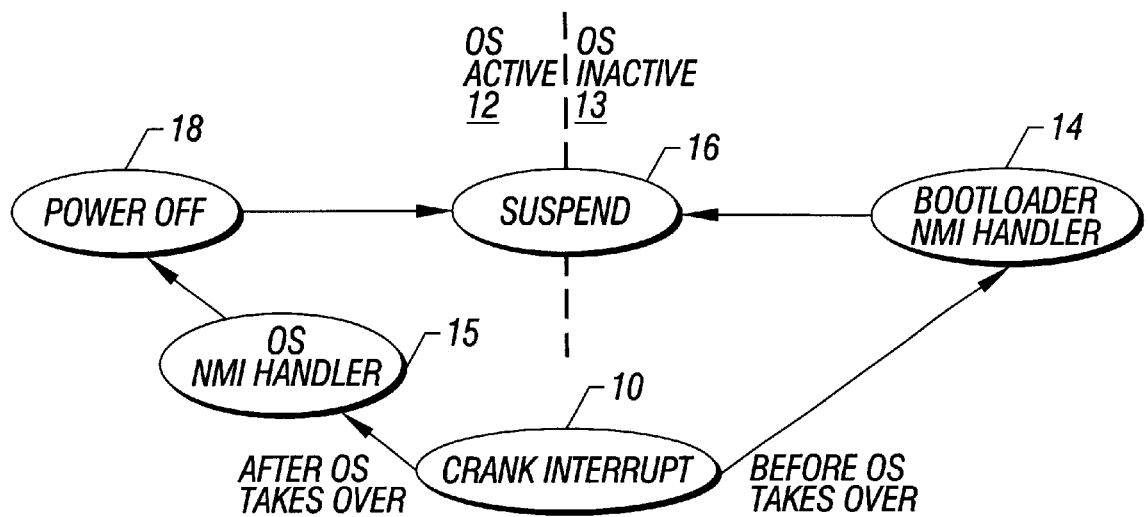
FIG. 1 is a state diagram for one embodiment of the present invention.

A processor-based system in a vehicle such as a car or a truck is generally exposed to the reduced power consumption state that occurs during engine cranking. Thus, referring to FIG. 1, a crank interrupt indicated at 10 may be experienced. The crank interrupt may be a signal indicative of cranking operation which may supplied directly to the processor of a processor-based system.

Upon receiving the crank indicative signal, the system can take one of two alternative courses. If the operating system is already active, in response to the crank interrupt, an operating system non-maskable interrupt handler 15 is invoked. The handler 15 may cause a routine which is responsible for reducing the power consumption state of the system to be activated as indicated at 18. The routine may save the context of devices in the processor-based system and place those devices into an off condition which may be the D3 state associated with the Advanced Configuration and Power Interface (ACPI) Specification, Revision 1.0, Dec. 22, 1996 (available at www.teleport.com/~acpi).

The amount of time that the routine 18 takes may be determined by controlling the number of steps which the routine implements. That is, the time period required for the power off routine 18 to save device states and then enter a reduced power consumption mode, such as a suspend-to-RAM, may be engineered to involve less time than the amount of time between the crank interrupt and the crank-induced reduction of system power. The power reduction is due to the dedication of available power sources to the cranking operation. In general, this time period is generally less than about 20 milliseconds in current systems.

Thus, in response to the crank interrupt signal, a power off routine may be called directly by a non-maskable interrupt (NMI) handler when the operating system is active. The power off routine, after shutting peripheral devices down, places the system in a reduced power consumption state 16 such as suspend-to-RAM, in one embodiment of the present invention.

If the system is in a reduced power consumption mode before the power reduction occurs, the system can resume out of the reduced power consumption mode quickly after the cranking operation is done. Thus, the effect of the cranking operation and its associated power reduction is largely invisible to the user, in one embodiment of the present invention.

Alternatively, if the operating system has not yet been activated at the time when a crank interrupt signal 10 occurs, a bootloader may begin operation by immediately vectoring to an NMI handler 14 which may operate without invoking the power off routine 18. In this case, since the operating system is not yet active, it is not necessary to save the context of devices. The old context of the devices may still be valid at this point, stored in the previous reduced power consumption state such as suspend-to-RAM or suspend-to-non-volatile memory, in one embodiment of the invention. It is virtually certain that those devices have no new context to save at this point. The system may vector to the NMI handler while the bootloader is running, putting the system back into a reduced power consumption state 16, such as the suspend-to-RAM or suspend-to-non-volatile state. The system may very quickly be placed into the safer, reduced power consumption state well in advance of the power reduction that occurs during engine cranking.

Thus, in either case, the system may suspend to a lower power consumption state prior to the power reduction that occurs when the engine cranks. This prevents the system from failing which would require rebooting and delay to full system operation. In addition, previous contexts of applications may be lost as well.

Generally, when the ignition is turned on after a given period of no operation, the system uses the right path in FIG. 1, loads the bootloader NMI handler 14 and immediately resumes the reduced power consumption state 16. However, if the user turns to the ignition accessory (ACC) feature, the system operates for a period without cranking. The operating system eventually boots. Thereafter, if the engine is cranked, the left path in FIG. 1 may be taken and the power off routine 18 may be called before going to the lower power consumption state.

In many cases, at least two lower power consumption states may be provided. A first lower power consumption state, such as suspend-to-RAM, may reduce the power consumption but provide for quicker resumption to a normal operating state. A second lower power consumption state, such as suspend-to-non-volatile memory, may take more time to resume the system while using less power. Commonly, if the system is inactive for a period exceeding a preset time period, the system goes from normal operating state to the suspend-to-RAM state. If the period of inactivity continues in excess of another time period, the system may suspend to non-volatile memory (STN), in one embodiment of the invention.

Thus, when the engine is operated, the system may be either in a suspend-to-RAM or suspend-to-non-volatile memory, as examples. In either case, the operation of the system shown in FIG. 1 may be the same, in one embodiment of the present invention. That is, whatever power consumption state the system was in before the engine cranks, if the operating system is not active, the system determines what was the prior state and suspends to the state it was in prior to engine cranking. Of course, if the operating system is active, the system would not be in either the suspend-to-RAM or the suspend-to-non-volatile memory states. In other embodiments, it may be desirable to always place the system into suspend-to-RAM state rather than to return the system to a suspend-to-non-volatile memory state when a crank interrupt signal is received.

Figure 2:
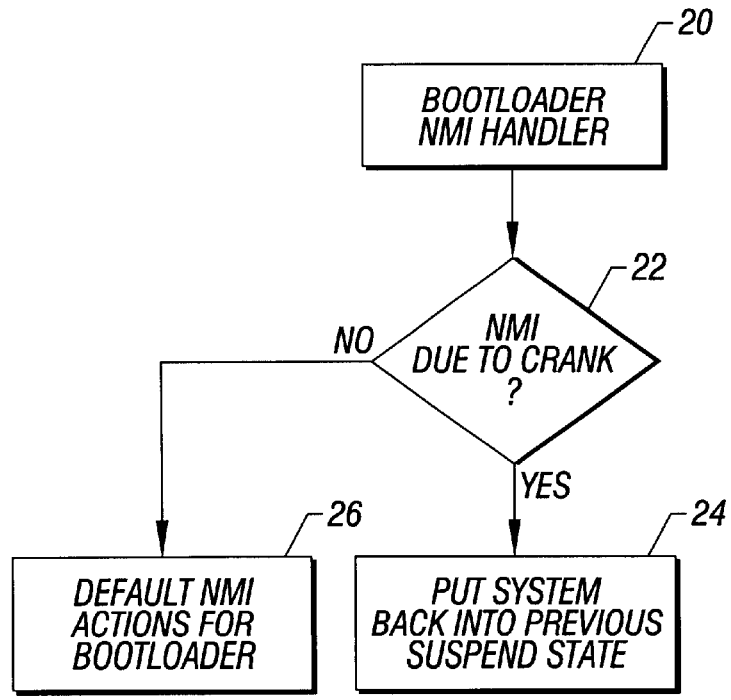
FIG. 2 is a flow chart for one aspect of one embodiment of the present invention.

Referring next to FIG. 2, a flow for implementing software for the bootloader NMI handler 14 begins by calling the bootloader and the NMI handler as indicated at block 20. The flow in FIG. 2 arises when the operating system is not yet active. At diamond 22 a check determines whether the active non-maskable interrupt is due to engine cranking. If so, the system immediately resumes a reduced power consumption state as indicated at block 24. Otherwise, the system defaults to the conventional NMI response for the given bootloader.

Figure 3:
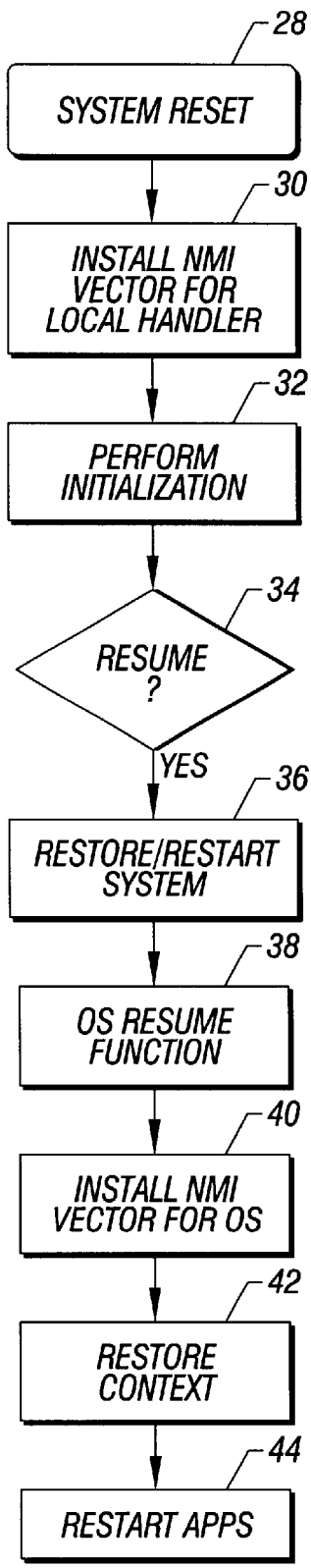
FIG. 3 is a flow chart for another aspect of one embodiment of the present invention.

Referring now to FIG. 3, software for setting the vector to either the handler 20 or an operating system NMI handler 46 begins at system reset 28. The NMI vector for the local handler is installed at block 30. The vector for the local handler is initially set to point to the bootloader NMI handler 20. Thus, immediately upon system reset, a vector to the bootloader NMI handler is installed. The vector causes a jump to occur to an interrupt handler.

Next as indicated at block 32, an initialization or booting process may be implemented. At diamond 34 a check determines whether a system resume has occurred. If so, the system is restored or restarted as indicated at block 36.

The booting sequence then resumes the operating system as indicated in block 38. The NMI vector for the operating system NMI handler 46 (FIG. 4) is installed (block 40) in place of the vector to the handler 20. Device contexts may be restored using a stored image, for example, as indicated in block 42 and any applications may be restarted as shown in block 44. Thus, the sequence from block 38 to 44 is a boot sequence from system reset to operation of the operating system and applications associated therewith.

After the operating system has been activated, the vector for the operating system NMI handler replaces the vector to the bootloader NMI handler. Namely, at block 40, the vector is redirected, after the operating system has resumed, to the operating system NMI handler 46 from the bootloader NMI handler 20, as set initially.

Figure 4:
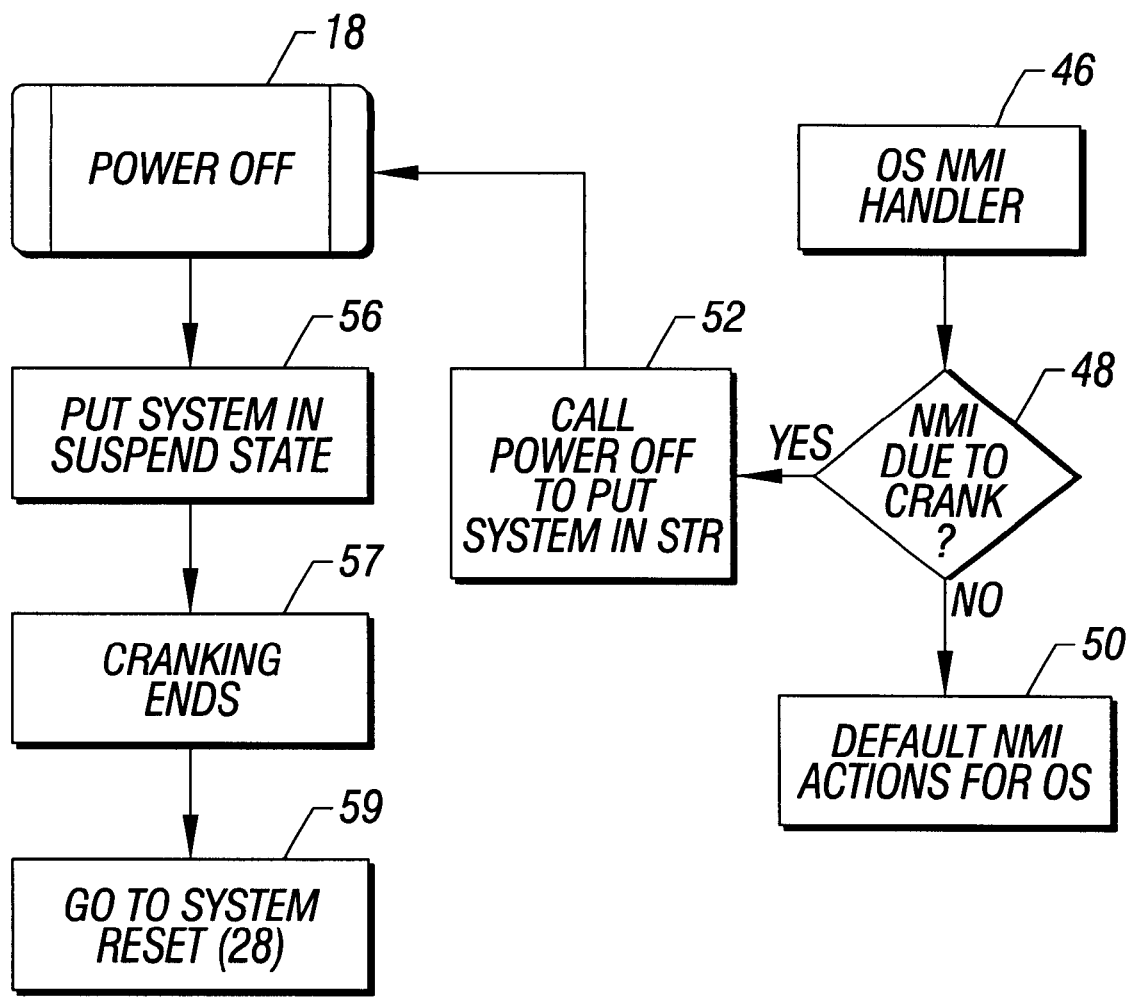
FIG. 4 is a flow chart for another of aspect of one embodiment of the present invention.

The operation of the operating system NMI handler 46, shown in FIG. 4, begins by determining if the active non-maskable interrupt is due to engine cranking as determined in diamond 48. If so a power off routine 18, discussed previously, is called to put the system into a lower power consumption state such as the suspend-to-RAM state. Otherwise, the normal default actions for other types of non-maskable interrupts are implemented as indicated at block 50.

In this case, the power off routine 18 is initiated (blocks 52 and 18) and the system is placed into a suspend state as indicated at block 56. In the course of operating the power off routine 18, device contexts are saved and devices may be placed into a reduced power consumption state or an off state such as the D3 state in the ACPI Specification. Upon operating system resume (block 38), the flow continues through blocks 40–44. After cranking ends (block 57), a signal may be generated by the ignition system, causing a wake-up signal to be received by the processor, indicating that cranking is complete. The system may then resume automatically from system reset (block 28) in response to that wake-up signal (block 59).

Thus, in either case, whether the operating system is already active or whether it is inactive during a cranking cycle, the system may be placed into a reduced power consumption state within a determinate period of time. The time is determinate because the bootloader NMI handler operates quickly without involving the operating system to return the system to its initial reduced power consumption state, without even bothering to power down devices or save contexts.

Alternatively, if the operating system is active, the power off routine 18 may be called. However, because the power off routine 18 is called directly without involving the operating system, the transition to the reduced power consumption state may occur within a determinate period of time. The amount of time may be determined by controlling the number of activities that the power off routine 18 implements.

In contrast, if the operating system were involved, there is no way to know how many applications or drivers have been loaded onto the system. Thus, the amount of time that the operating system would take to transition to the reduced power consumption state is indeterminate. In some situations, that indeterminate amount of time may exceed the available time to power the system down before the cranking induced power reduction occurs. Thus, with one embodiment of the present invention, the system may adaptively handle an interrupt due to cranking, whether or not the operating system is active, returning the system to a reduced power consumption state before the crank induced power reduction adversely affects the system.

Figure 5:
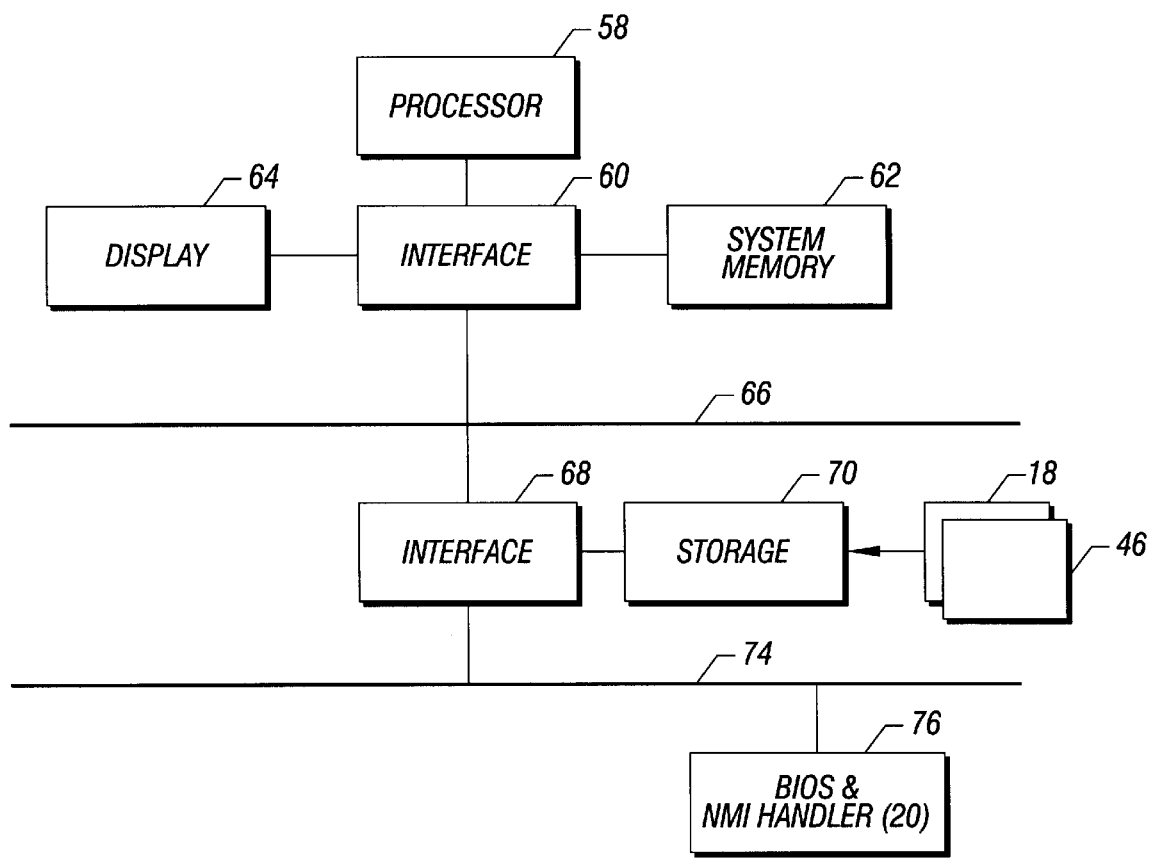
FIG. 5 is a block diagram showing one embodiment of the present invention.

Referring next to FIG. 5, the system may include a processor 58 coupled to an interface 60 which in turn is coupled to system memory 62. The interface 60, in one embodiment of the present invention, may be coupled to a display 64. The interface 60 may also be coupled to a bus 66 and another interface 68. The interfaces 60 and 68 may be implemented through chipsets or bridges. The interface 68 couples a bus 74 and storage 70. In some processor-based systems used in vehicles, the storage 70 may be implemented by a flash memory system. In other cases, a hard disk drive storage may be utilized.

The operating system NMI handler 46 as well as the power off routine 18 may be stored on the storage 70. The basic input/output system (BIOS) 76 may be stored on a memory associated with the bus 74. Conventionally, the BIOS is stored in a read only memory (ROM) that may be provided on a legacy bus 74. The non-maskable interrupt handler 20 may be stored with the BIOS 76, as indicated in FIG. 4, for quick operation.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor-based system for use in a vehicle comprising:
    a processor;
    a storage coupled to said processor;
    a detector to detect a signal indicative of engine cranking and to suspend a processing function of said system to a lower power consumption state before a crank induced power reduction occurs.

2. The system of claim 1 wherein said processor-based system suspends to a reduced power consumption state within 20 milliseconds after detecting the signal indicative of engine cranking.

3. The system of claim 2 wherein said processor is programmed to act as said detector.

4. The system of claim 3 including a basic input/output system, coupled to said processor, an operating system and an interrupt handler or return the system to a lower power consumption state when the operating system is inactive when the signal indicative of engine cranking signal is detected.

5. An article comprising a medium for storing instructions that cause a processor-based system in a vehicle to:
    detect a signal indicative of engine cranking; and
    suspend a processing function of the system to a lower power consumption state before a crank induced power reduction occurs.

6. The article of claim 5 further storing instructions that cause a processor-based system to determine whether the operating system of said processor-based system is active after detecting a signal indicative of engine cranking.

7. The article of claim 6 further storing instructions that cause a processor-based system to use a first interrupt handler if an operating system is active and use a second interrupt handler if the operating system is inactive.

8. The article of claim 7 further storing instructions that cause a processor-based system to install a first vector to the first interrupt handler after system reset and replace said first vector with a second vector to the second interrupt handler after the operating system becomes active.

9. The article of claim 8 further storing instructions that cause a processor-based system to save device contexts before causing the system to enter the lower power consumption state if the operating system is active.

10. The article of claim 9 further storing instructions that cause a processor-based system to call a routine for saving the device contexts directly without involving the operating system upon detecting a signal indicative of engine cranking.

11. The article of claim 8 further storing instructions that cause a processor-based system to return the system to a lower power consumption state if the operating system is not active.

12. A method for operating a processor-based system in a vehicle comprising:
    detecting a signal indicative of engine cranking; and
    suspending a processing function of said system to a lower power consumption state before a crank induced power reduction occurs.

13. The method of claim 12 further including determining whether the operating system of the processor-based system in a vehicle is active after detecting a signal indicative of engine cranking.

14. The method of claim 13 further including using a first interrupt handler if an operating system is active and using a second interrupt handler if the operating system is inactive.

15. The method of claim 14 further including installing a first vector to the first interrupt handler after system reset and replacing said first vector with a second vector to the second interrupt handler after the operating system becomes active.

16. The method of claim 15 wherein, if the operating system is active, saving device contexts before causing said system to enter the lower power consumption state.

17. The method of claim 16 further including calling a routine for saving the device contexts directly without involving the operating system, upon detecting a signal indicative of engine cranking.

18. The method of claim 15 further including immediately returning the system to a lower power consumption state if the operating system is not active.

19. The method of claim 12 wherein suspending includes causing said system to enter a lower power consumption state within 20 milliseconds after detecting a signal indicative of engine cranking.

20. The method of claim 12 wherein suspending includes determining the lower power consumption state that the system was in at the time a signal indicative of engine cranking was detected and suspending said system to that state.

* * * * *